(12) United States Patent
Durand

(10) Patent No.: US 6,548,792 B1
(45) Date of Patent: *Apr. 15, 2003

(54) MOLECULAR BONDING OF VEHICLE FRAME COMPONENTS USING MAGNETIC IMPULSE WELDING TECHNIQUES

(75) Inventor: Robert D. Durand, Reading, PA (US)

(73) Assignee: Dana Corporation, Toledo, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/862,033

(22) Filed: May 21, 2001

Related U.S. Application Data

(60) Division of application No. 09/138,597, filed on Aug. 22, 1998, now Pat. No. 6,234,375, which is a continuation-in-part of application No. 08/666,063, filed on Jun. 14, 1996, now Pat. No. 6,104,012, which is a continuation-in-part of application No. 08/491,284, filed on Jun. 16, 1995, now abandoned.

(51) Int. Cl.⁷ .................................................. H05B 6/10
(52) U.S. Cl. .................. 219/617; 219/603; 219/635; 228/115; 228/107
(58) Field of Search .................. 228/115, 107; 219/633, 635, 617, 603; 72/56

(56) References Cited

U.S. PATENT DOCUMENTS

| | | | |
|---|---|---|---|
| 2,895,747 A | * | 7/1959 | Bland et al. ................ 228/178 |
| 3,258,573 A | * | 6/1966 | Morin et al. ................ 219/153 |
| 3,313,536 A | | 4/1967 | Dutton et al. |
| 3,417,456 A | | 12/1968 | Carlson |
| 3,520,049 A | | 7/1970 | Lysenko et al. |
| 3,528,596 A | | 9/1970 | Carlson |
| 3,590,464 A | | 7/1971 | Wildi et al. |
| 3,603,759 A | | 9/1971 | Peacock |
| 3,603,760 A | * | 9/1971 | Khrenov et al. ............ 219/617 |
| 3,794,805 A | | 2/1974 | Rudd |
| 3,961,739 A | | 6/1976 | Leftheris |
| 4,049,937 A | | 9/1977 | Khimenko et al. |
| 4,129,846 A | | 12/1978 | Yablochnikov |
| 4,144,433 A | | 3/1979 | Zelahy et al. |
| 4,150,274 A | * | 4/1979 | Minin et al. ................ 219/59.1 |
| 4,170,887 A | | 10/1979 | Baranov |
| 4,261,092 A | | 4/1981 | Corwin |
| 4,334,417 A | | 6/1982 | Victor |
| 4,504,714 A | * | 3/1985 | Katzenstein ................ 219/617 |
| 4,513,188 A | | 4/1985 | Katzenstein |
| 4,523,872 A | | 6/1985 | Arena |
| 4,650,947 A | | 3/1987 | Hutton et al. |
| 4,789,094 A | * | 12/1988 | Chudakov ................ 219/607 |
| 4,807,351 A | * | 2/1989 | Berg et al. ................ 29/419.2 |
| 4,885,215 A | | 12/1989 | Yoshioka et al. |
| 4,922,075 A | | 5/1990 | Sofue et al. |
| 4,930,204 A | * | 6/1990 | Schurter ................ 228/136 |

(List continued on next page.)

FOREIGN PATENT DOCUMENTS

WO    97/00595    1/1997

*Primary Examiner*—Tom Dunn
*Assistant Examiner*—Colleen P. Cooke
(74) *Attorney, Agent, or Firm*—MacMillan, Sobanski & Todd, LLC

(57) ABSTRACT

A method for manufacturing a vehicle frame assembly includes the initial steps of providing first and second structural components, disposing portions of the first and second structural components in an overlapping relationship, and generating an electromagnetic field that causes at least one of the overlapping portions of the first and second structural components to move into contact with the other of the overlapping portions of the first and second structural components at a high velocity so as to be joined together to form a joint. Third and fourth structural components are provided. The third and fourth structural components are joined to the first and second structural components together to form a vehicle frame assembly.

14 Claims, 14 Drawing Sheets

U.S. PATENT DOCUMENTS

| | | |
|---|---|---|
| 4,950,348 A | 8/1990 | Larsen |
| 4,950,552 A | 8/1990 | Amend et al. |
| 4,990,732 A | 2/1991 | Dudko et al. |
| 5,157,969 A | 10/1992 | Roper |
| 5,170,557 A | 12/1992 | Rigsby |
| 5,326,957 A | 7/1994 | Karube et al. |
| 5,339,667 A | 8/1994 | Shah et al. |
| 5,442,846 A * | 8/1995 | Snaper ..................... 285/382.1 |
| 5,561,902 A * | 10/1996 | Jacobs et al. ................ 280/785 |
| 5,882,460 A | 3/1999 | Durand et al. |
| 5,884,722 A * | 3/1999 | Durand et al. .............. 180/312 |
| 5,966,813 A * | 10/1999 | Durand ....................... 219/611 |
| 6,255,631 B1 * | 7/2001 | Kichline et al. ............ 219/617 |

\* cited by examiner

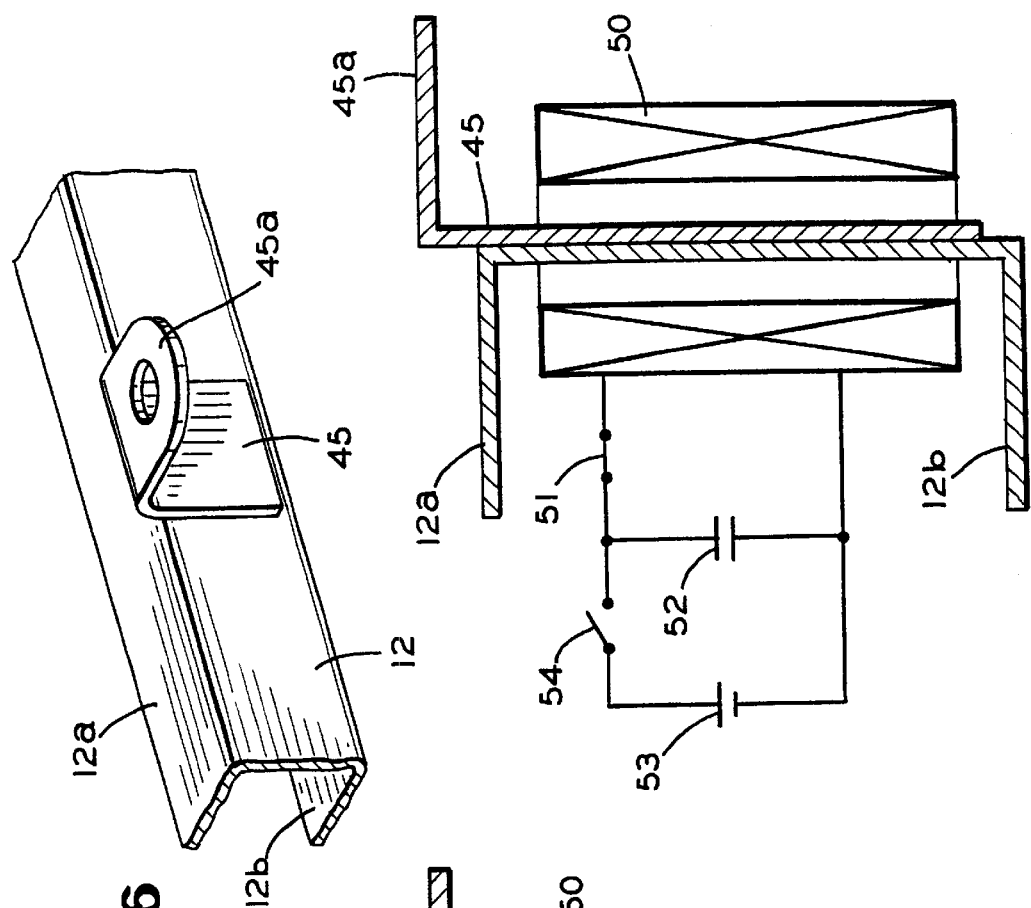
FIG. 6
FIG. 8
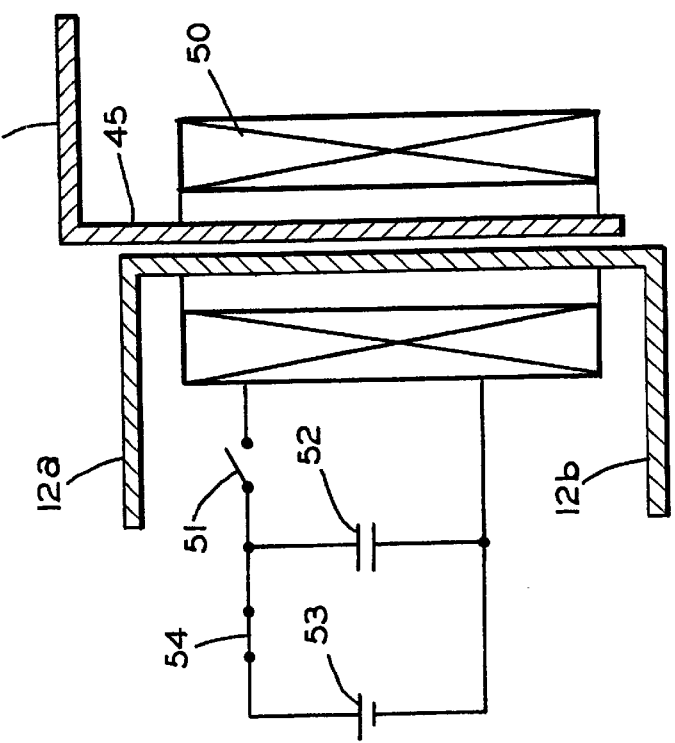
FIG. 7

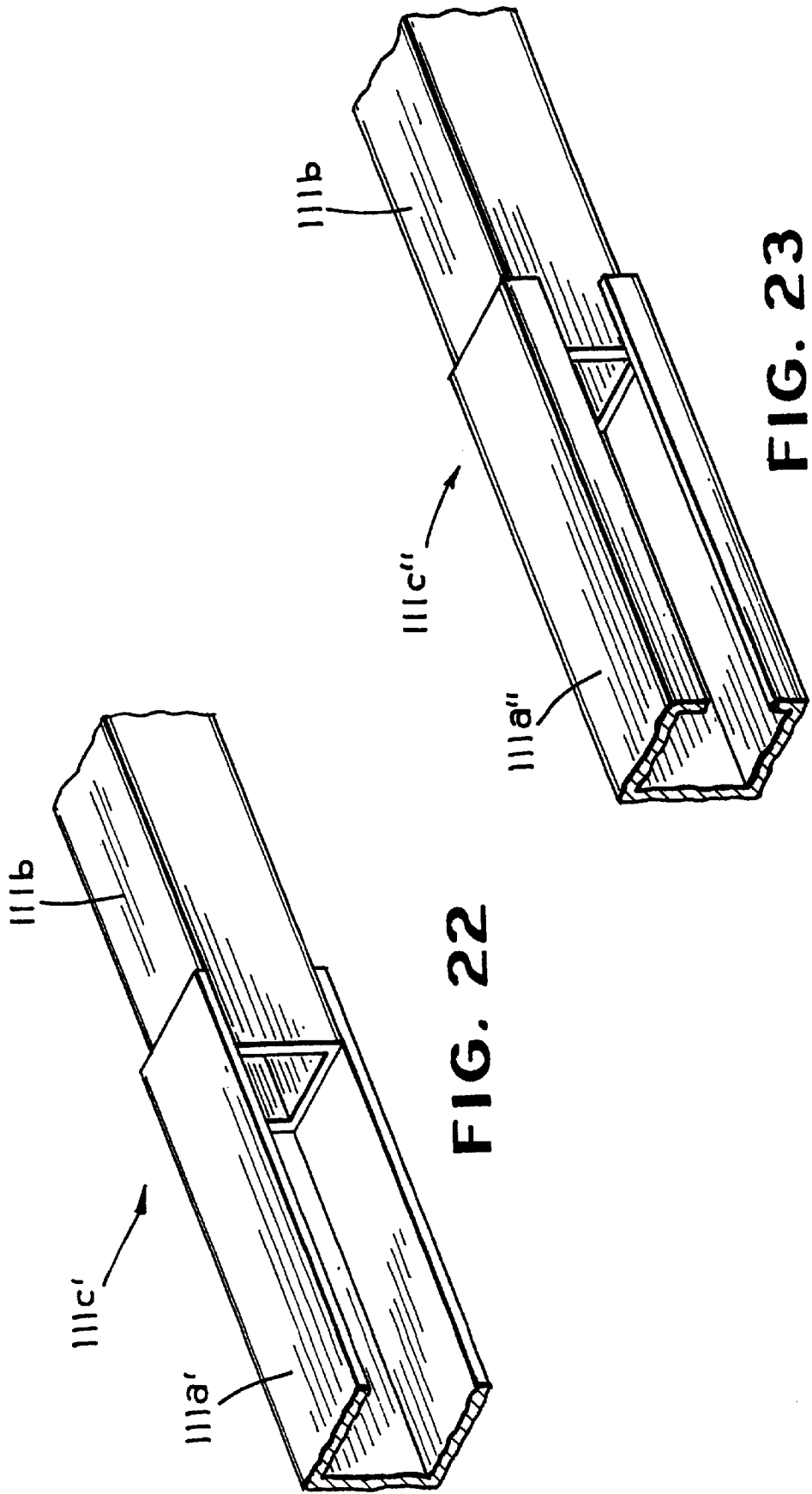

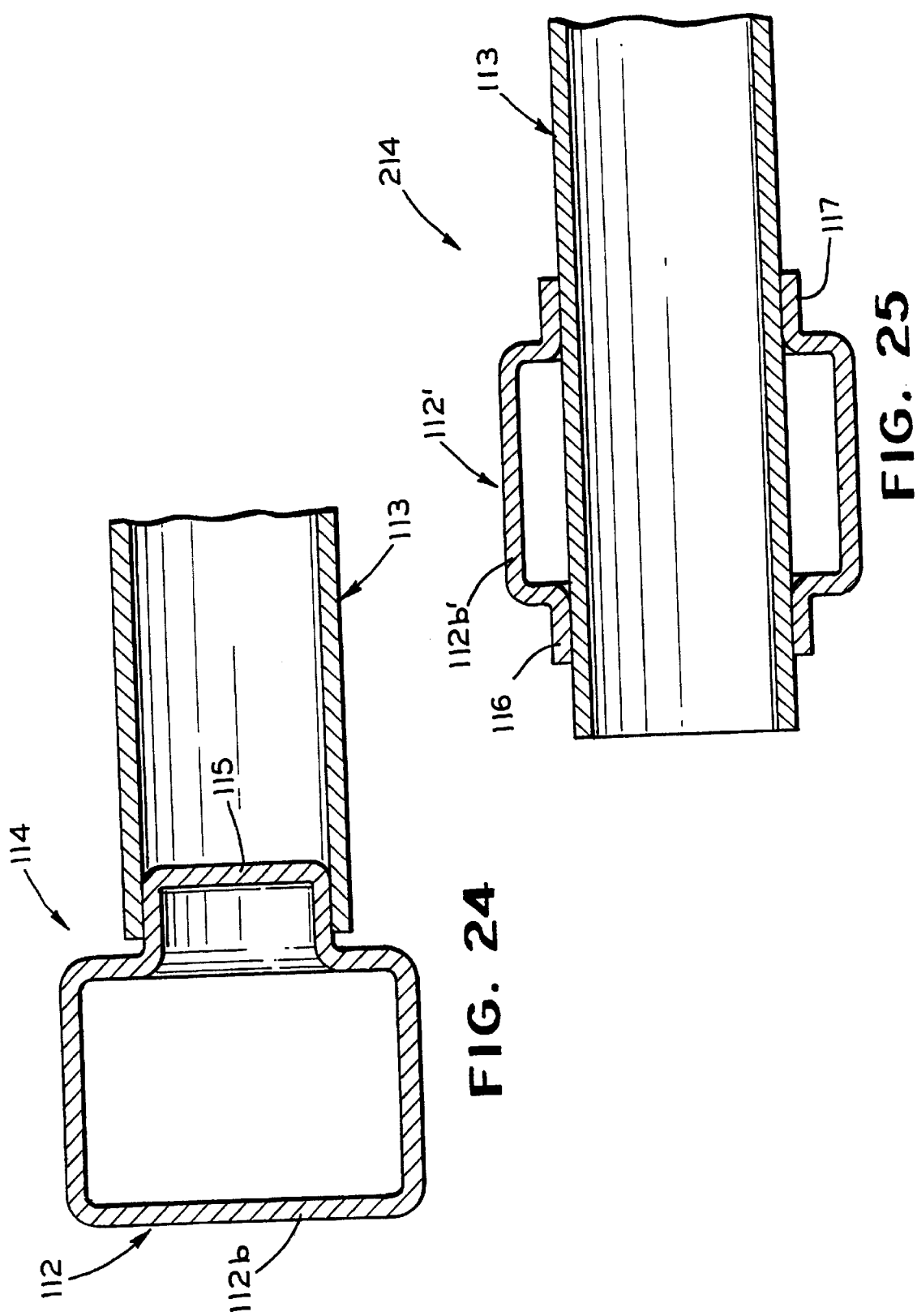

MOLECULAR BONDING OF VEHICLE FRAME COMPONENTS USING MAGNETIC IMPULSE WELDING TECHNIQUES

CROSS REFERENCE TO RELATED APPLICATIONS

This application is a division of Ser. No. 09/138,597, filed Aug. 22, 1998 (now U.S. Pat. No. 6,234,375, issued May 22, 2001), which is a continuation-in-part of Ser. No. 08/666, 063, filed Jun. 14, 1996, (now U.S. Pat. No. 6,104,012, issued Aug. 15, 2000) which is a continuation-in-part of Ser. No. 08/491,284 filed Jun. 16, 1995, now abandoned.

BACKGROUND OF THE INVENTION

This invention relates in general to the manufacture and assembly of vehicle frame components and in particular to a method and apparatus for permanently joining two or more metallic vehicle frame components using magnetic impulse welding techniques.

Virtually all land vehicles in common use, such as automobiles and trucks, include a frame which serves as a platform upon which the remainder of the vehicle is built. Many vehicle frame structures are known in the art. Most of these known vehicle frame structures are formed from a number of individual metallic components which are permanently joined together. For example, a typical vehicle frame is composed of a pair of longitudinally extending side rails which are joined together by a plurality of transversely extending cross members. In shorter length vehicles, the side rails can be formed from a single piece of metal. In longer vehicles, however, each of the side rails is usually formed from two or more side rail sections which are permanently joined together. In either event, the side rails and cross members, once joined together, form a frame for supporting the remaining portions of the vehicle thereon. To facilitate the attachment of the other portions of the vehicle to the vehicle frame, a variety of brackets, hangers, cradles, and the like are often joined to the side rails and cross members at desired locations. It is common practice to also form these supporting hardware components from metallic materials, and further to permanently join them to the side rails and cross members at desired locations.

Conventional welding techniques have been commonly used to permanently join the various components of the vehicle frame together. As is well known, conventional welding techniques involve the application of heat to localized areas of two metallic members, which results in a coalescence of the two metallic members. Such welding may or may not be performed with the application of pressure, and may or may not include the use of a filler metal. Although conventional welding techniques have functioned satisfactorily in the past, there are some drawbacks to the use thereof in joining metallic vehicle frame components together. First, as noted above, conventional welding techniques involve the application of heat to localized areas of the two metallic frame members. This application of heat can cause undesirable distortions and weaknesses to be introduced into the metallic components. Second, while conventional welding techniques are well suited for joining components which are formed from similar metallic materials, it has been found to be somewhat more difficult to adapt them for use in joining components formed from dissimilar metallic materials. Third, conventional welding techniques are not easily adapted for joining components which have different gauge thicknesses. Inasmuch as the production of vehicle frames is usually an high volume, low margin process, it would be desirable to provide an improved method and apparatus for permanently joining two or more metallic vehicle frame components which avoids the drawbacks of conventional welding techniques.

SUMMARY OF THE INVENTION

This invention relates to a method and apparatus for permanently joining two or more metallic vehicle frame components using magnetic impulse welding techniques. In a first embodiment, the vehicle frame may include a pair of similar or dissimilar tubular side rail members in multiple sections joined together by a plurality of transversely extending closed (tubular or rectangular) or open ("C" of "U" shaped) cross members. A plurality of similar or dissimilar material brackets are joined to the side rails and/or cross members to facilitate the attachment of other portions of the vehicle to the vehicle frame. These components are joined via an overlap joint formed by the joining of two individual side rail sections, a cross member section and a side rail section, or a bracket and a side rail section or a cross member section. The first component and the second component, if tubular side rails, are sized so that they may be disposed telescopically with clearance. Similarly, the first component and second component, if a cross members/side rail, a bracket/cross member, or a bracket side/side rail, are sized and/or positioned so that some clearance exists between the components. An electromagnetic coil is provided for generating a magnetic field that causes the first component and the second component to move toward one another. Portions of the electromagnetic coil are disposed on either side of the side rail sections. A first end of the electromagnetic coil is connected through a switch to a first side of a capacitor, while a second end of the electromagnetic coil is connected directly to a second side of the capacitor. A source of electrical energy is provided for selectively charging the capacitor to store a quantity of electrical energy. By closing the switch, electrical energy is passed from the capacitor through the electromagnetic coil. Consequently, an intense electromagnetic field is generated about the first and second components. The presence of this electromagnetic field induces electrical currents in the first and second side rail sections. These electrical currents, in turn, create magnetic fields that draw the first and second components into contact with one another. When this occurs, the force generated by the magnetic fields cause the first and second components to move toward each other at great velocities. The high velocity of impact when the first and second components meet, and the large pressures produced on impact cause the first and second components to weld or molecularly bond. The first and second components, be they side rail sections, cross member sections, or brackets can include straight members, curved members, joint nodes, and member nodes. Some or all of these components can be formed by a hydroforming process, wherein high pressure fluid is introduced within a closed blank to expand portions thereof outwardly into conformance with an enclosing die. Initially, a closed tubular blank having a uniform circular cross sectional shape and formed from a metallic material is provided. The tubular blank may, if necessary, be pre-bent into a preform shape using a conventional tube bending apparatus. Next, the pre-bent blank is disposed within a hydroforming die, and highly pressurized fluid is introduced therein. The highly pressurized fluid causes portions of the pre-bent blank to expand outwardly into conformance with the hydroforming die. The final step is to join the formed structural members together to form the vehicle frame assembly. An electromagnetic coil can be used to cause the telescoping end portions of two structural members to move toward one another to generate a weld or molecularly bond the members together.

Various objects and advantages of this invention will become apparent to those skilled in the art from the following detailed description of the preferred embodiments, when read in light of the accompanying drawings.

BRIEF DESCRIPTION OF THE DRAWINGS

FIG. 6 is an enlarged perspective view of a portion of one of the side rails illustrated in FIG. 1 having a bracket joined thereto.

FIG. 7 is a sectional elevational view of the side rail and bracket illustrated in FIG. 6 prior to being joined together FIG. 8 is a sectional elevational view similar to FIG. 7 of the side rail and bracket illustrated in FIG. 6 after being joined together.

FIG. 22 illustrates a first alternative embodiment of the joint between the side rail sections illustrated in FIGS. 19, 20, and 21.

FIG. 23 illustrates a second alternative embodiment of the joint between the side rail sections illustrated in FIGS. 19, 20, and 21.

FIG. 24 is a sectional elevational view taken along line 24—24 of FIG. 19 illustrating a first embodiment of a joint between a side rail and a cross member.

FIG. 25 is a sectional elevational view similar to FIG. 24 illustrating a second embodiment of a joint between a side rail and a cross member.

DETAILED DESCRIPTION OF THE PREFERRED EMBODIMENTS

Figure 1:
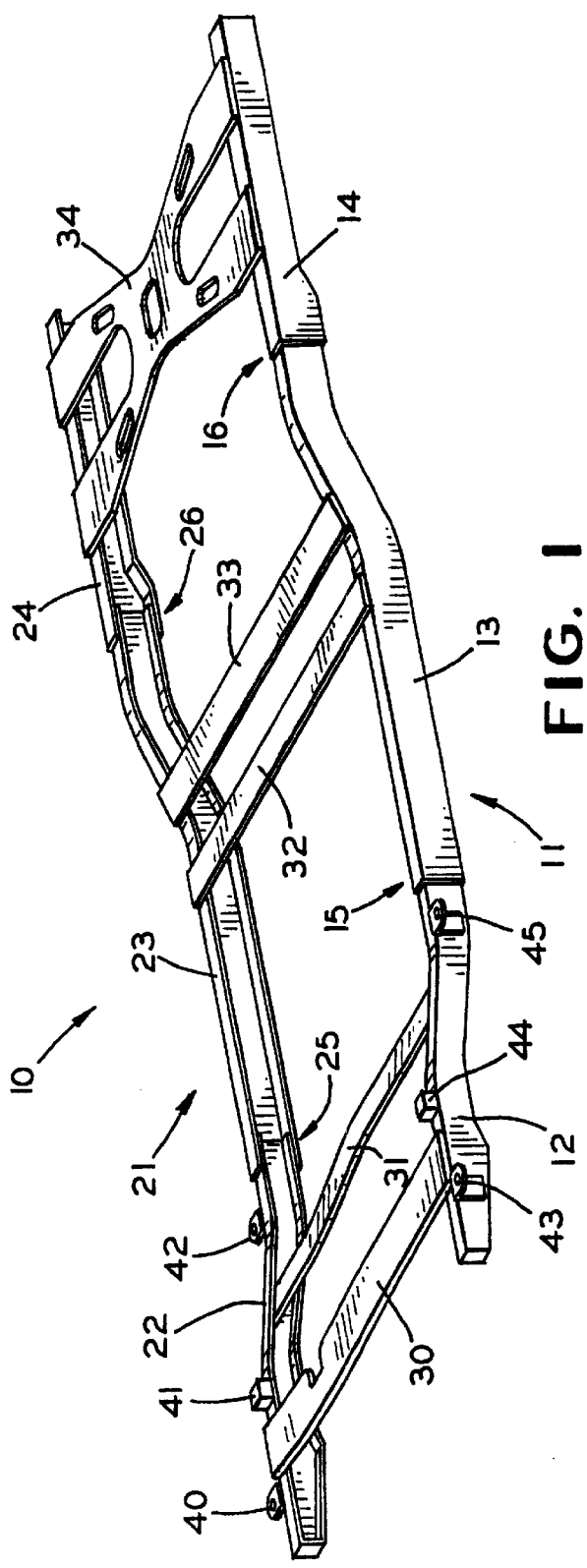
FIG. 1 is a schematic perspective view of a first embodiment of a vehicle frame manufactured in accordance with the method and apparatus of this invention.
Figure 2:
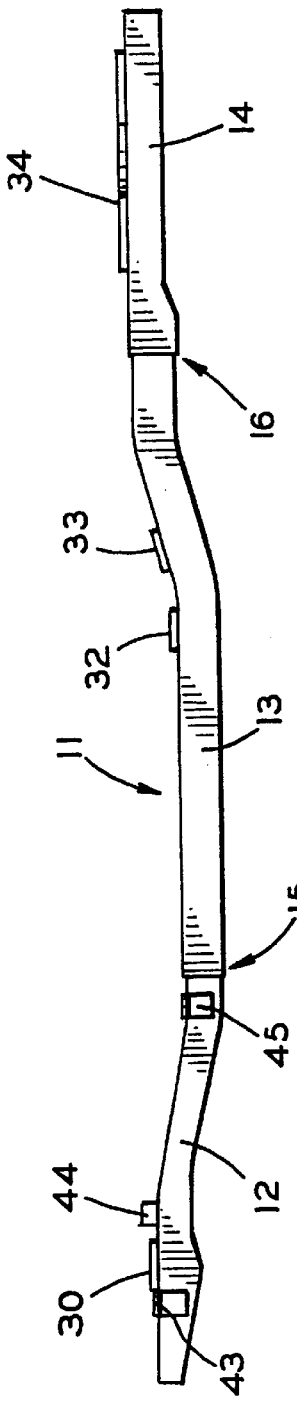
FIG. 2 is a side elevational view of one of the side rails of the vehicle frame illustrated in FIG. 1, together with a number of brackets joined therewith, the side rail being formed from a plurality of individual side rail sections joined at overlap joints.

Referring now to the drawings, there is illustrated in FIG. 1 a first embodiment of a vehicle frame, indicated generally at 10, which has been manufactured in accordance with the method and apparatus of this invention. The frame 10 includes a first side rail, indicated generally at 11, which extends longitudinally throughout the length of the vehicle in which it is to be used. As shown in FIGS. 1 and 2, the first side rail 11 is formed from three individual side rail sections 12, 13, and 14. The first and second side rail sections 12 and 13 are joined at an overlap joint, indicated generally at 15. Similarly, the second and third side rail sections 13 and 14 are joined at an overlap joint, indicated generally at 16. The structures of the individual side rail sections 12, 13, and 14 and of the overlap joints 15 and 16 of the first side rail 11 will be described in further detail below. Although three individual rail sections 12, 13, and 14 are illustrated, it will be appreciated that the side rail 11 may be formed from any number of individual side rail sections. The frame 10 further includes a second side rail, indicated generally at 21, which also extends longitudinally throughout the length of the vehicle in which it is to be used. The second side rail 21 is formed in a similar manner as the first side rail 11, including first, second, and third individual side rail sections 22, 23, and 24 which are joined at overlap joints 25 and 26.

The side rails 11 and 21 are joined together by a plurality of transversely extending cross members 30, 31, 32, 33, and 34. These cross members 30 through 34 vary in size and shape and are intended to represent any type of cross member, cradle, or other structure which extends between the two side rails 11 and 21. The basic structures of cross member of this type are well known in the art. Additionally, a plurality of brackets 40, 41, 42, 43, 44, and 45 are joined to the side rails 11 and 21. These brackets 40 through 45 also vary in size and shape and are intended to represent any type of bracket, hanger, or other structure which is joined to the side rails 11 and 21. The basic structures of these brackets are also well known in the art.

The various components of the vehicle frame 10 discussed above are all formed from metallic materials. For example, steel has been found to be an acceptable material to form these various components. However, this invention contemplates that other metallic materials may be used, such as aluminum, magnesium, and the like may be used. Also, it is contemplated that all of the various components of the vehicle frame 10 need not be formed from the same metallic material. Rather, some of such components may be formed from a first metallic material, while others may be formed from a second metallic material.

The vehicle frame 10 is formed by joining the various side rails 11 and 21, cross members 30 through 34, and brackets 40 through 45 together. Some of these components may be joined together by the use of mechanical fasteners, such as bolts, if desired. However, this invention relates to a method and apparatus for permanently joining these components together using a magnetic impulse welding techniques, which will be described below. Magnetic impulse welding techniques have been found to be preferable to conventional welding techniques in the formation of vehicle frames, as discussed above.

Figure 3:
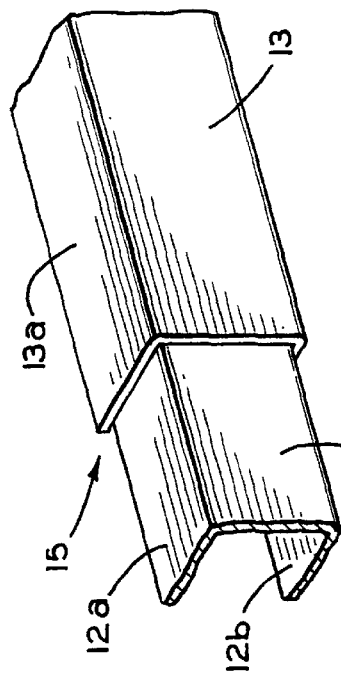
FIG. 3 is an enlarged perspective view of one of the overlap joints between two of the individual side rail sections illustrated in FIG. 2.

Referring now to FIG. 3, there is illustrated an enlarged perspective view of the overlap joint 15 between the ends of the individual side rail sections 12 and 13 illustrated in FIGS. 1 and 2. As shown therein, the rearward end of the first side rail section 12 includes a vertically extending web portion having an upper horizontal flange portion 12a and a lower horizontal flange portion 12b extending therefrom. Similarly, the forward end of the second side rail section 13 includes a vertically extending web portion having an upper horizontal flange portion 13a and a lower horizontal flange portion 13b extending therefrom. Although the ends of the first and second side rail sections 12 and 13 are shown as having generally open channel or C-shaped cross sectional shapes, it will be appreciated that they may be formed having other cross sectional shapes. Also, it will be appreciated that the cross sectional shapes of the first and second side rail sections 12 and 13 need not be uniform throughout their entire lengths, nor does the cross sectional shape of the first side rail section 12 have to be the same as the cross sectional shape of the second side rail section 13.

Figure 4:
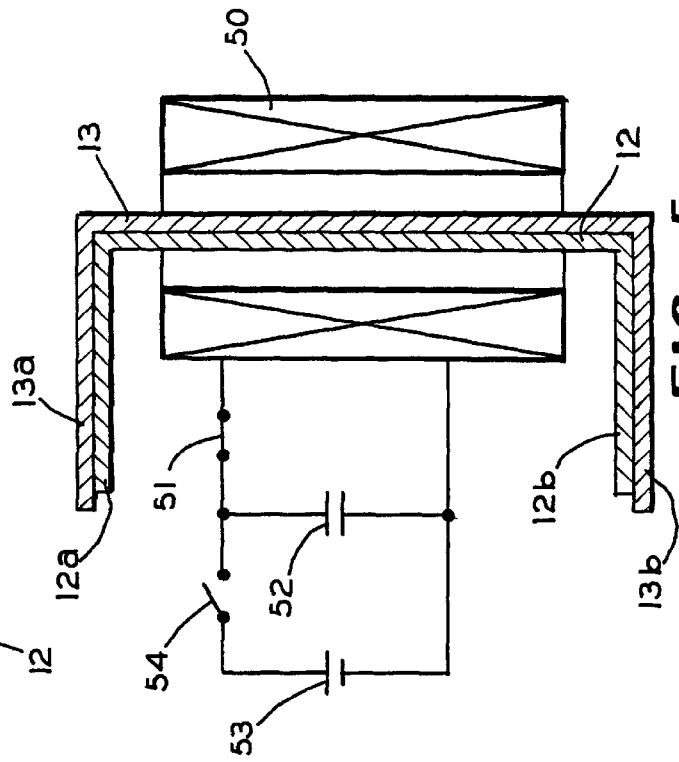
FIG. 4 is a sectional elevational view of the two individual side rail sections illustrated in FIG. 3 prior to being joined together.

Referring now to FIG. 4, it can be seen that the first side rail section 12 is initially formed slightly smaller in size than the second side rail section 13, prior to being joined together. Thus, the first side rail section 12 may initially be disposed telescopically within the second side rail section 13 with clearance, as shown in FIG. 4. When so disposed, the vertically extending web portions of the side rail sections 12 and 13 are disposed generally parallel and adjacent to one another, as are the upper horizontal flange portions 12a and 13a and the lower horizontal flange portions 12b and 13b. Although the clearance between the respective portions of the side rail sections 12 and 13 may be adjusted as desired, it has been found acceptable to provide a clearance in the range of from 0.050 inch to 0.100 inch.

An electromagnetic coil 50 is provided for generating a magnetic field which, as will be explained further below, causes the side rail sections 12 and 13 to move toward one another. Portions of the electromagnetic coil 50 are disposed on either side of the side rail sections 12 and 13. The electromagnetic coil 50 is embodied as a plurality of windings of an electrical conductor. A first end of the electrical conductor is connected through a first switch 51 to a first side of a capacitor 52, while a second end of the electrical conductor is connected directly to a second side of the capacitor 52. The capacitor 52 is representative of a number of high voltage capacitors which are connected together in parallel. A source of electrical energy 53 is provided for selectively charging the capacitor 52 to store a quantity of electrical energy therein. A first side of the source of electrical energy 53 is connected through a second switch 54 to the first side of the capacitor 52, while a second side of the source of electrical energy 53 is connected directly to the second side of the capacitor 52.

Figure 5:
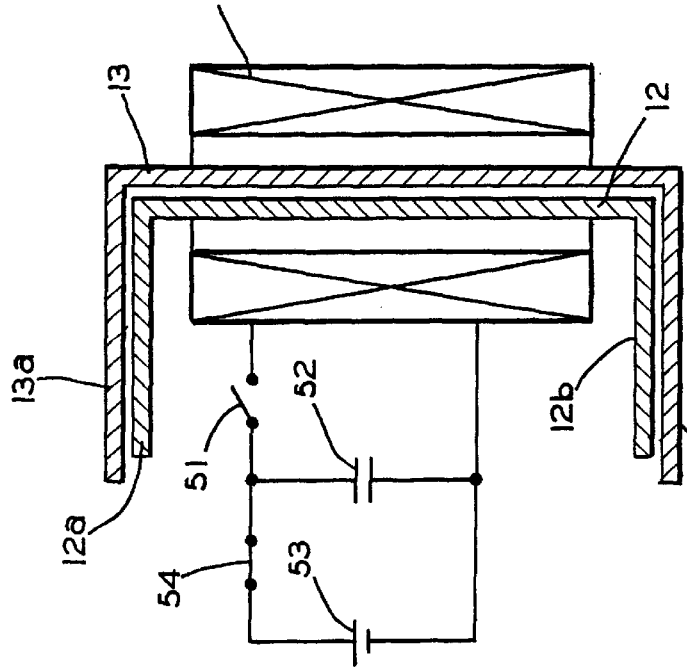
FIG. 5 is a sectional elevational view similar to FIG. 4 of the two individual side rail sections illustrated in FIG. 3 after being joined together.

In operation, the first switch 51 is initially opened and the second switch 54 is initially closed, as shown in FIG. 4. In this condition, electrical energy is transferred from the source of electrical energy 53 into the capacitor 52. When a sufficient amount of electrical energy has been stored in the capacitor 52, the second switch 54 is opened and the first switch 51 is closed, as shown in FIG. 5. By closing the first switch 51, energy in the form of electrical current is discharged from the capacitor 52 through the electromagnetic coil 50. As a result, an intense electromagnetic field is generated about the first and second side rail sections. The presence of this electromagnetic field induces electrical currents in the first and second side rail sections 12 and 13. These electrical currents, in turn, create opposing magnetic fields which draw the first and second side rail sections 12 and 13 into contact with one another. When this occurs, a large pressure exerted on the first and second side rail sections 12 and 13 move them toward one another at a high velocity.

The high velocity impact of the first and second side rail sections 12 and 13, as well as the large pressures exerted thereon, cause the two components to weld or molecularly bond. The sizes and shapes of the side rail sections 12 and 13, the size and shape of the electromagnetic coil 50, and the strength of the electromagnetic field are all factors which will determine where the deformation of the first and second side rail sections 12 and 13 will occur, as well as which portions thereof will be joined together.

Referring now to FIG. 6, there is illustrated an enlarged perspective view of a portion of the individual side rail section 12 and the bracket 45 illustrated in FIGS. 1 and 2. As discussed above, the first side rail section 12 includes the vertically extending web portion having the upper horizontal flange portion 12a and the lower horizontal flange portion 12b extending therefrom. The bracket 45 is formed having a vertically extending web portion having an upper horizontal flange portion 45a extending therefrom. The vertically extending web portions of the first side rail section 12 and the bracket 45 are disposed in spaced apart relationship, generally parallel and adjacent to one another as shown in FIG. 7. Portions of the electromagnetic coil 50 are disposed on either side of the side rail section 12 and the bracket 45. The operation of the electromagnetic coil 50 is the same as described above, and functions to weld or molecularly bond the side rail section 12 with the bracket 45, as shown in FIG. 8.

Figure 9:
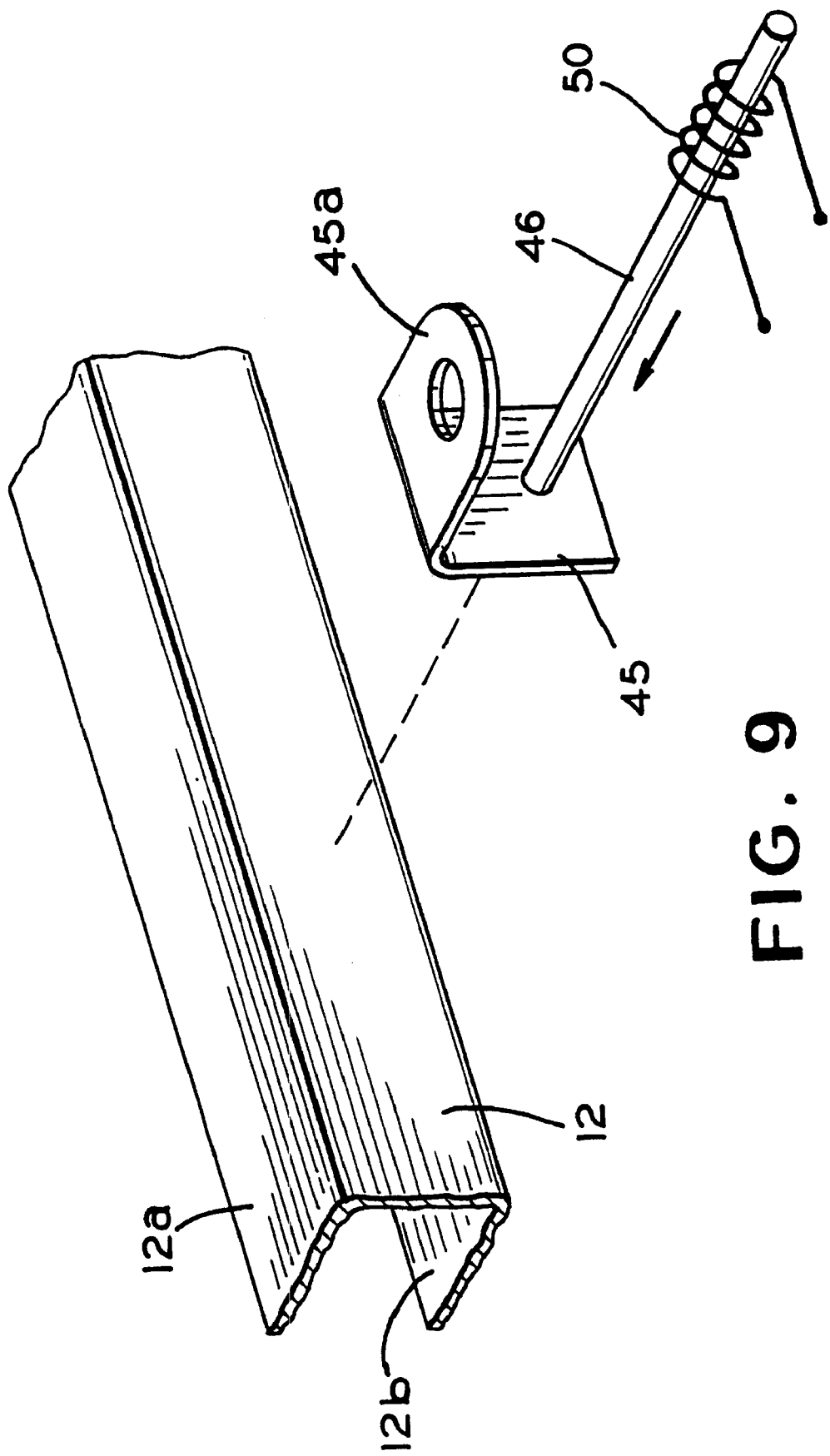
FIG. 9 is a perspective view similar to FIG. 6 of an alternative structure for securing the side rail and bracket together.

FIG. 9 illustrates an alternative structure for securing the side rail 12 and the bracket 45 together. As shown therein, the coil 50 is disposed concentrically about an elongated cylindrical mandrel 46. The mandrel 46 is formed from a material which, when a magnetic field is generated by energization of the electromagnetic coil 50, is urged for movement in the direction indicated by the arrow. One end of the mandrel 46 is located adjacent to the vertically extending web portion of the bracket 45. The bracket 45 may be secured to the end of the mandrel 45 or may simply be disposed adjacent thereto. In either event, when the electromagnetic coil 50 is energized as described above, the mandrel 45 and the vertically extending web portion of the bracket 45 are driven axially toward the side rail 12 at a high velocity. In this manner, the bracket 45 is welded or molecularly bonded to the side rail 12 similarly as described above.

The side rails 11 and 12 described above are all shown as being formed from open channel stock, i.e., stock which has a non-closed cross sectional shape. The specifically illustrated side rails 11 and 12 are formed having a generally open C-shaped cross section. It will be appreciated that this invention may be practiced using open channel stock having other cross sectional shapes. For example, the side rails 11 and 12 may be formed having a generally closed C-shaped cross section (wherein short flanges are provided at the ends of the illustrated side rails 11 and 12 which extend inwardly toward one another), a generally hat-shaped cross section (wherein short flanges are provided at the ends of the illustrated side rails 11 and 12 which extend outwardly apart from one another), or other open channel configurations.

Figure 10:
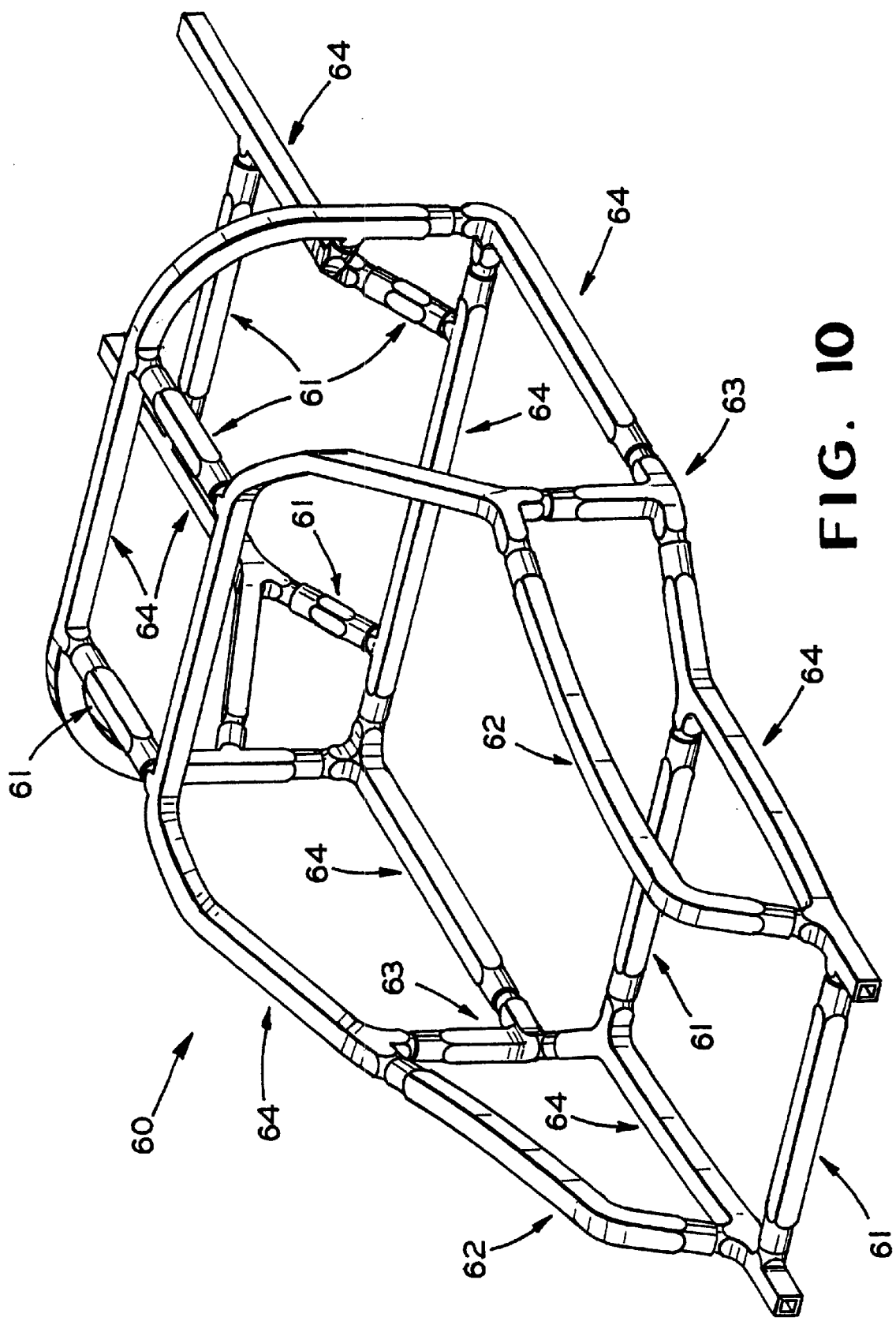
FIG. 10 is a schematic perspective view of a second embodiment of a vehicle frame manufactured in accordance with the method and apparatus of this invention, including a plurality of structural members which are joined together at joints by a plurality of joint nodes.
Figure 11:
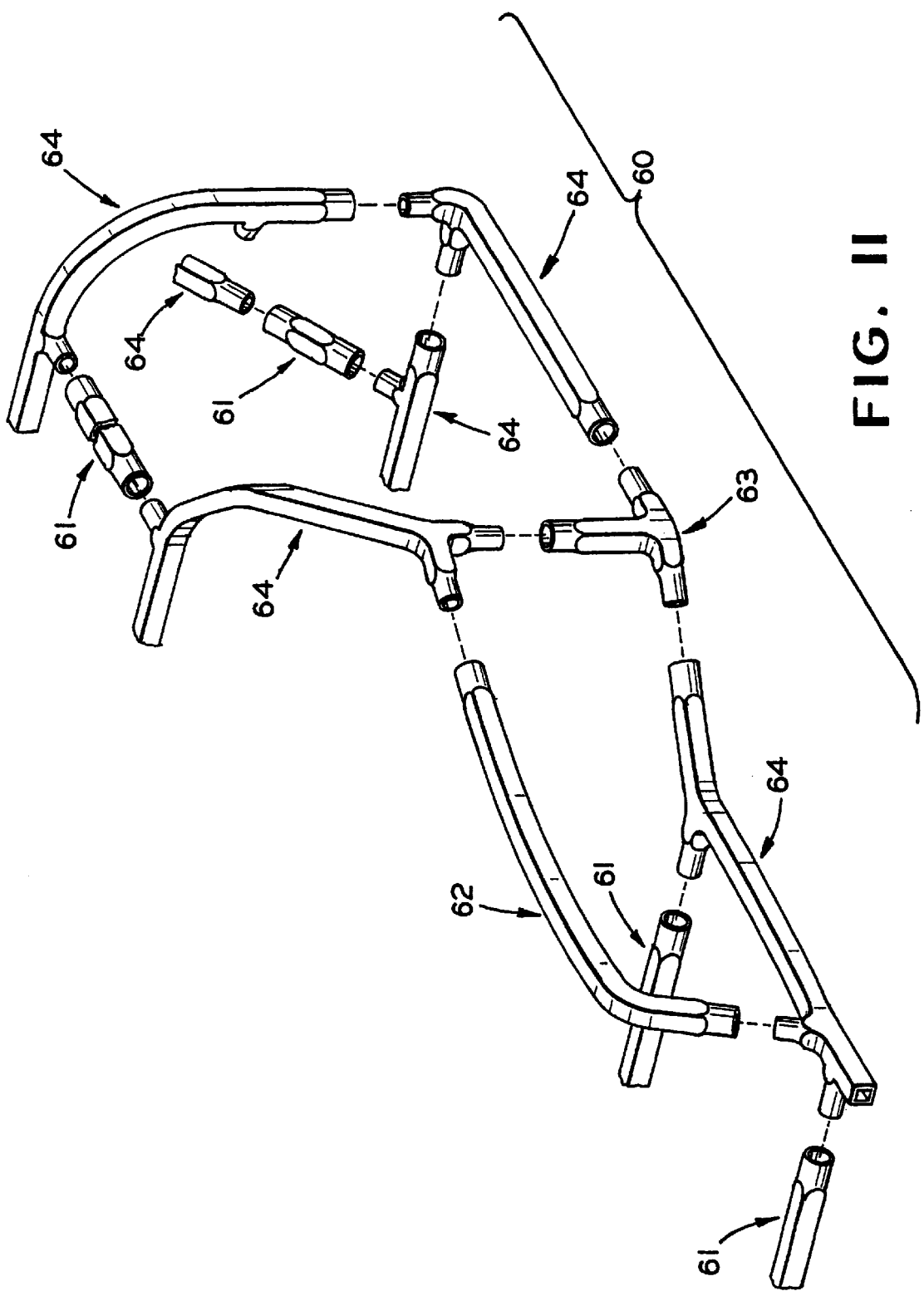
FIG. 11 is an exploded perspective view of a portion of the vehicle frame illustrated in FIG. 10.
Figure 12:
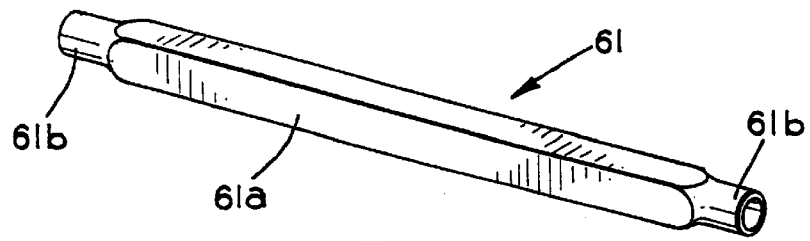
FIG. 12 is a perspective view of one of the straight members illustrated in FIGS. and 11.

Referring now to FIGS. 10 and 11, there is illustrated a second embodiment of a vehicle frame assembly, indicated generally at 60, in accordance with this invention. The illustrated vehicle frame assembly 60 is an automobile space frame, i.e., a frame for an automobile which defines an enclosed space for occupants. However, as is apparent from the preceding discussion, this invention may be utilized in a flat bed frame or any other frame structure for any type of vehicle. The illustrated vehicle frame assembly 60 is composed of four different types of structural components which are secured together. The first type of structural component is referred to as a straight member, such as shown at 61. Straight members 61 are characterized as being linear and elongated in shape. The straight members 61 are hollow and can be formed having any desired cross sectional shape. For example, as shown in FIG. 12, a straight member 61 may be formed having a central portion 61a which is square or rectangular in cross sectional shape and a pair of end portions 61b which are circular in cross sectional shape. The square or rectangular cross sectional shape of the central portion 61a of the straight member 61 is desirable because it provides stiffness to the straight member 61 and facilitates the attachment of other components thereto, such as brackets and the like. As will be explained in greater detail below, the circular cross sectional shape of the end portions 61b of the straight member 61 is desirable because it facilitates the attachment of other structural components of the vehicle frame assembly 60.

Figure 13:
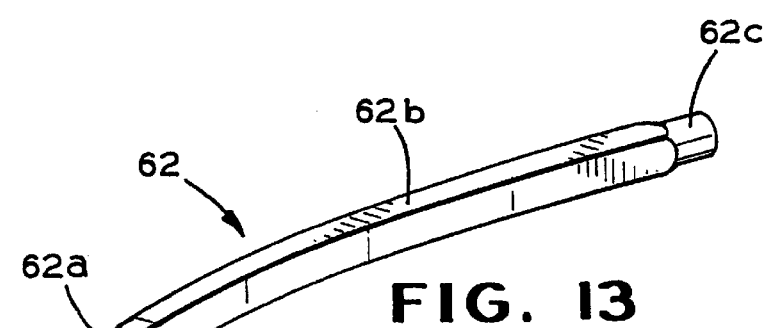
FIG. 13 is a perspective view of one of the curved members illustrated in FIGS. 10 and 11.

The second type of structural component in the vehicle frame assembly 60 is referred to as a curved member, such as shown at 62. Curved members 62 are similar to straight members 61 in that they are hollow and elongated. However, curved members 62 are not linear in shape like the straight members 61, but rather extend non-linearly. For example, as shown in FIG. 13, a curved member 62 may be formed having a single bend portion 62a which is located between two linear portions 62b. Alternatively, the curved member 62 may be formed having a plurality of bend portions 62a separating adjacent linear portions 62b, or it may be curved along its entire length. Preferably, for the same reasons as stated above with respect to the straight member 61, the linear portions 62b near the center of the curved member 62 are square or rectangular in cross sectional shape. Two end portions 62c are provided on the curved member 62 which are circular in cross sectional shape, also for the same reasons as stated above.

Figure 14:
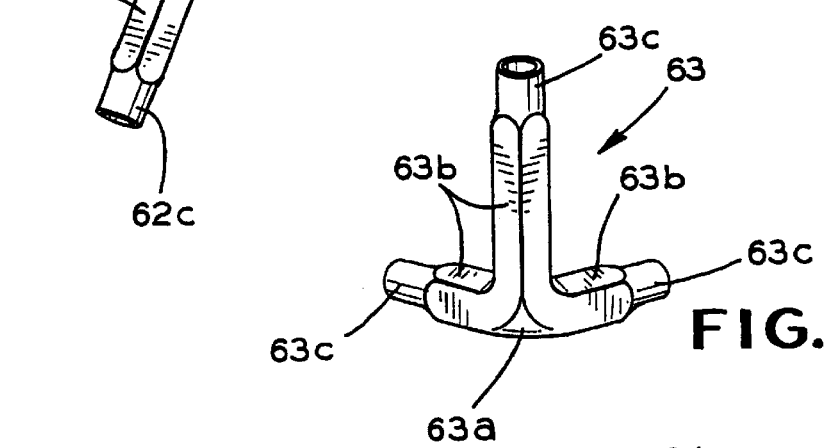
FIG. 14 is a perspective view of one of the joint nodes illustrated in FIGS. 10 and 11.

The third type of structural component in the vehicle frame assembly 60 is referred to as a joint node, such as shown at 63. Joint nodes 63 are characterized as relatively small components which are provided to join adjacent components of the vehicle frame assembly 60 at a joint. For example, as shown in FIG. 14, a joint node 63 may be formed having a relatively small body portion 63a with a plurality (three in the illustrated embodiment) relatively short joint portions 63b extending outwardly therefrom. The joint portions 63b are typically linear because of their relatively short length, although such is not required. The body portion 63a and the joint portions 63b are hollow and can be formed having any desired cross sectional shape. Again, for the same reasons stated above with respect to the straight member 61, the body portion 63a and adjacent areas of the joint portions 63b are preferably square or rectangular in cross sectional shape. Two end portions 63c are provided on the joint member 63 which are circular in cross sectional shape, also for the same reasons as stated above.

Figure 15:
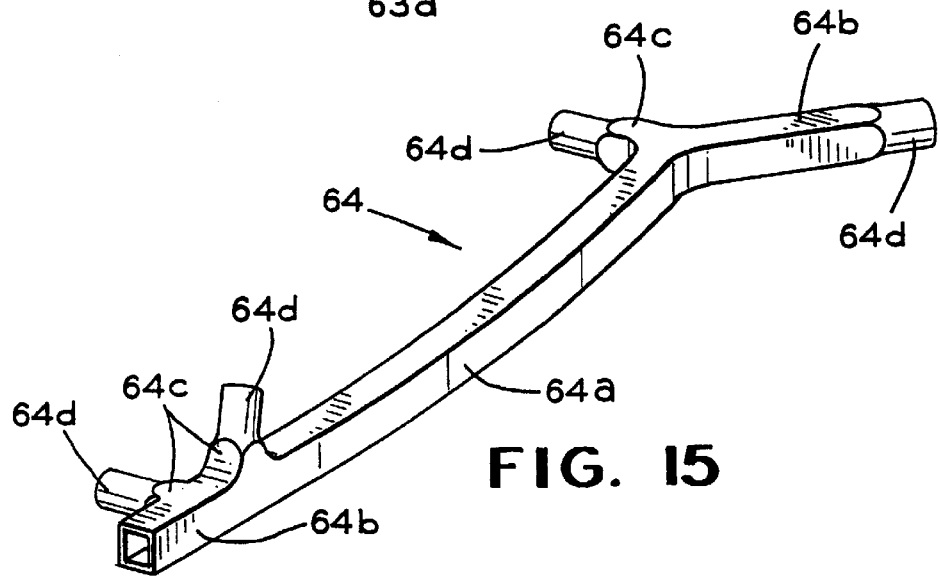
FIG. 15 is a perspective view of one of the member nodes illustrated in FIGS. 10 and 11.

The fourth type of structural component in the vehicle frame assembly 60 is referred to as a member node, such as shown at 64. Member nodes 64 are characterized as elongated components which are also provided to join adjacent components of the vehicle frame assembly 60 at a joint. For example, as shown in FIG. 15, a member node 64 may be formed having an elongated central portion 64a, a pair of end portions 64b, and one or more (three in the illustrated embodiment) relatively short joint portions 64c extending outwardly therefrom. As with the joint portion 63b described above, the joint portions 64c are typically linear because of their relatively short length, although such is not required. The central portion 64a, the end portions 64b, and the joint portions 64c are hollow and can be formed having any desired cross sectional shape. Again, for the same reasons stated above with respect to the straight member 61, the central portion 64a and adjacent areas of the joint portions 64c are preferably square or rectangular in cross sectional shape. End portions 62d are provided on the curved member 62 which are circular in cross sectional shape, also for the same reasons as stated above.

Figure 16:
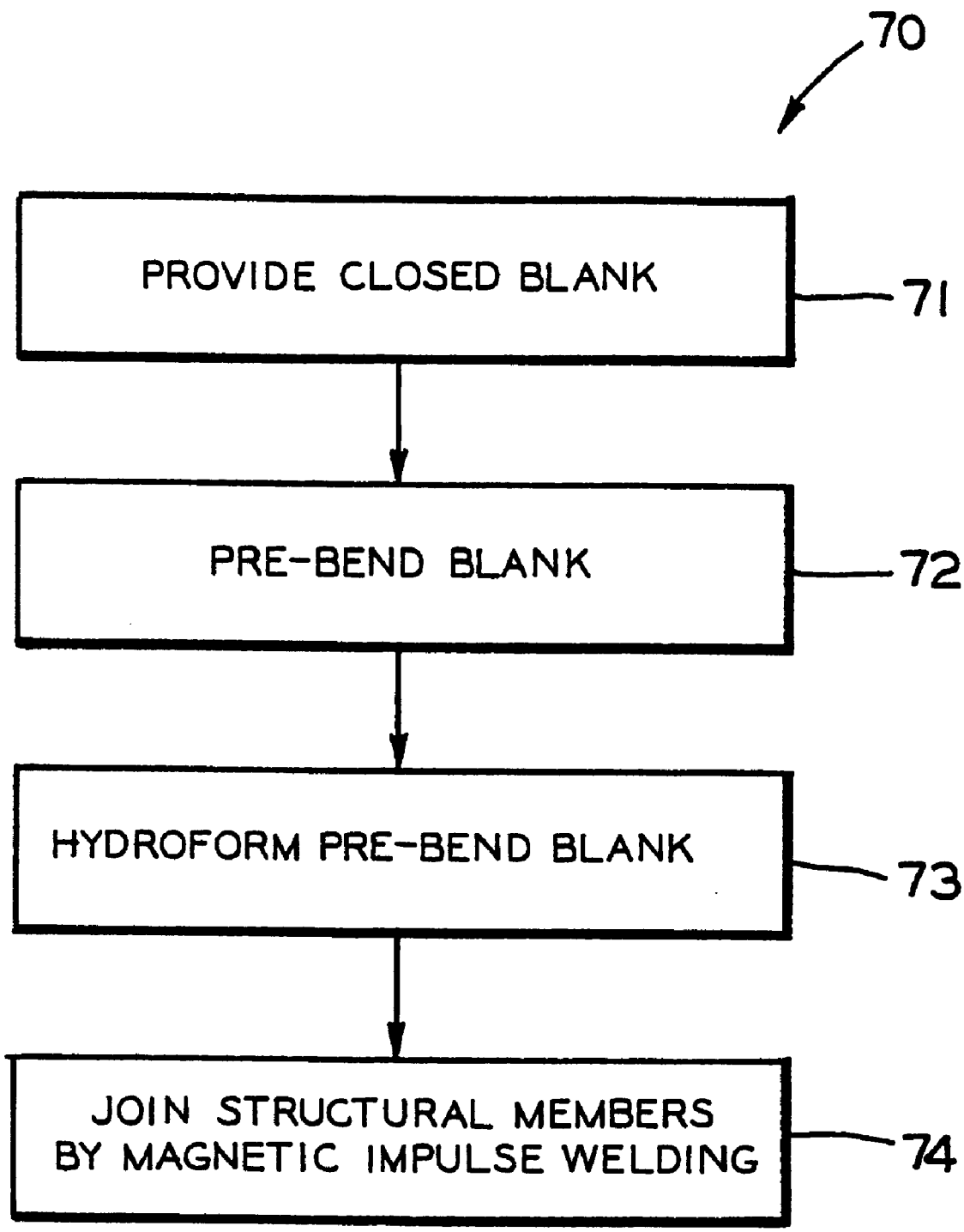
FIG. 16 is a flowchart which illustrates the steps in a hydroforming process for forming the structural components illustrated in FIGS. 12, 13, 14, and 15.

Each of the four types of structural components 61, 62, 63, and 64 used to form the vehicle frame assembly 60 is preferably formed by hydroforming techniques. Hydroforming is a metal deformation process which, generally speaking, utilizes high pressure fluid introduced within a closed workpiece to expand portions of the workpiece outwardly into conformance with an enclosing die. FIG. 16 is a flowchart 70 which illustrates the steps in the hydroforming process of this invention for forming any one or all of the four types of structural components 61, 62, 63, and 64 used to form the vehicle frame assembly 60. The first step 71 in the hydroforming process is to provide a closed blank. Typically, the closed blank is a tubular blank having a uniform circular cross sectional shape and formed from a metallic material. As discussed above, it is desirable that relatively lightweight strong metallic materials, such as aluminum, magnesium, and the like, be used. However, steel and other heavier metallic materials may be used as well.

Second, it is usually, but not always, necessary to pre-bend the tubular blank into a preform shape, as shown at 72. Such pre-bending is necessary when the final desired shape of the structural component is dramatically different from the initial shape of the tubular blank. Thus, pre-bending may not be required when forming a straight member 61 because of its generally linear shape, but may be required when forming a curved member 62. Several pre-bending operations may be performed on a single blank, depending upon the final desired shape for the structural component. Following this pre-bending, the blank follows the general shape of the structural component to be formed, but still has a generally uniform circular cross sectional shape throughout its entire length. The pre-bending step may be performed on a conventional tube bending apparatus or other similar mechanism.

Next, the pre-bent blank is disposed within a hydroforming die, and highly pressurized fluid is introduced therein, as shown at 73. The highly pressurized fluid within the pre-bent blank causes portions thereof to expand outwardly into conformance with the enclosed hydroforming die. In this manner, the portions of the structural members 61, 62, 63, and 64 having the square or rectangular cross sectional shapes discussed above can be formed. At the same time, various openings (not shown) or other structures may be formed on the structural components as desired, such as for facilitating the connection of other components (brackets, etc.) to the vehicle frame assembly 60. The hydroforming step can be performed on any conventional hydroforming apparatus.

Figure 18:
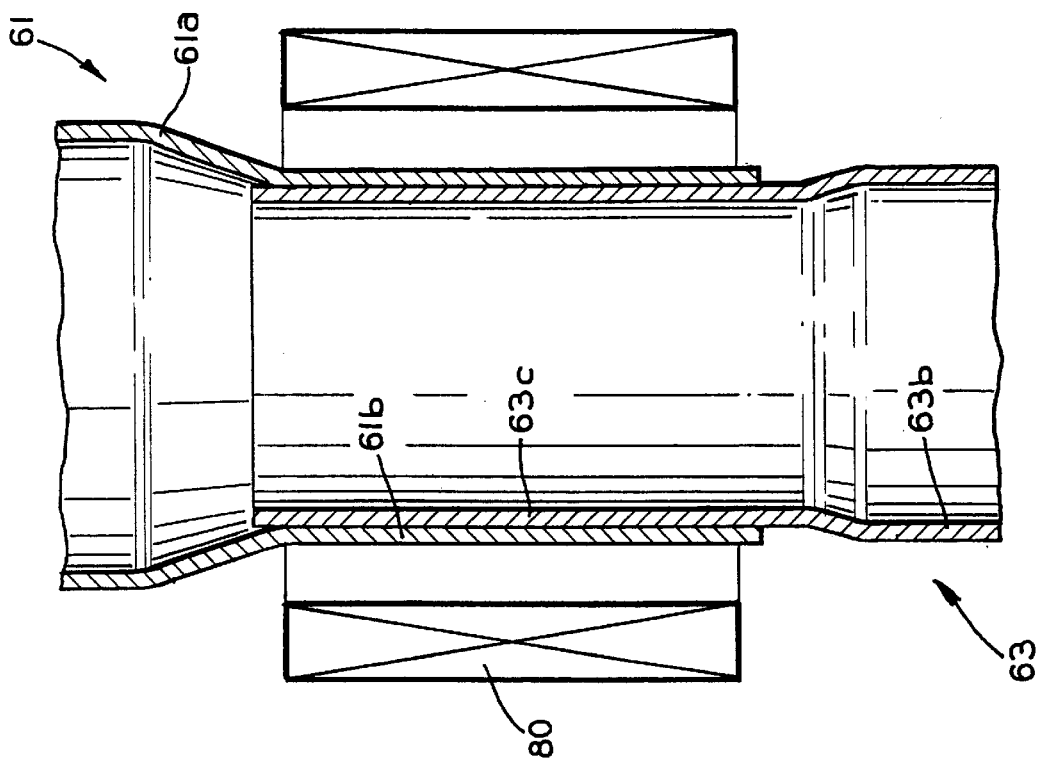
FIG. 18 is a sectional elevational view similar to FIG. 17 of the joint between a straight member and a joint node illustrated in FIGS. 10 and 11 after being joined together.
Figure 17:
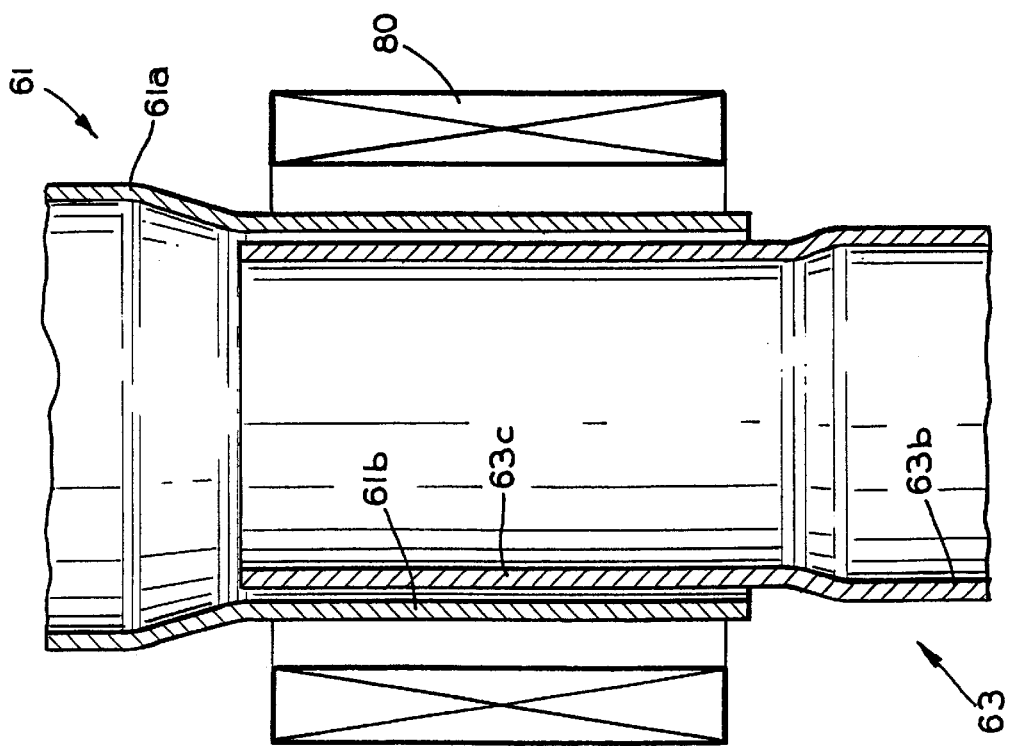
FIG. 17 is a sectional elevational view of one of the joints between a straight member and a joint node illustrated in FIGS. 10 and 11 prior to being joined together.

The final step in the process of forming the vehicle frame assembly is to join the formed structural members together, as shown at 74 in the flowchart 70. Referring now to FIGS. 17 and 18, the formation of a joint between one of the straight members 61 and one of the joint nodes 63 is illustrated. The end portion 61*b* of the straight member 61 is initially formed slightly larger in size than the end portion 63*c* of the joint portion 63*b* of the joint node 63, prior to being joined together. Thus, the end portion 63*c* of the joint node 63 may initially be disposed telescopically within the end portion 61*b* of the straight member 61 with an annular clearance, as shown in FIG. 17. When so disposed, the outer cylindrical surface of the end portion 63*c* of the joint node 63 is disposed generally concentric with the inner cylindrical surface of the end portion 61*b* of the straight member 61. Although the clearance between these cylindrical surfaces may be adjusted as desired, it has been found acceptable to provide a clearance in the range of from 0.050 inch to 0.100 inch.

An electromagnetic coil 80 is provided for generating a magnetic field which, as will be explained further below, causes the end portion 63*c* of the joint node 63 and the end portion 61*b* of the straight member 61 to move toward one another. The electromagnetic coil 80 is disposed concentrically about the end portion 61*b* of the straight member 61. The electromagnetic coil 80 is similar in structure and operation to the electromagnetic coil 50 described above, and the same control circuit may be used to operate same. Thus, when the switches 51 and 54 are operated as described above, the electromagnetic field generated by the coil 80 causes the end portion 61*b* of the straight member 61 to move toward the end portion 63*c* of the joint node 63 at a high velocity. As a result, the end portion 61*b* of the straight member 61 and the end portion 63*c* of the joint node 63 are welded or molecularly bonded as described above.

As also discussed above, the various components of the vehicle frame 60 need not be formed from the same metallic material. Rather, some of such components may be formed from a first metallic material, while others may be formed from a second metallic material. For example, referring back to FIG. 10, it will be appreciated that the various structural components which are located in the upper portion of the vehicle frame assembly 60 (i.e., those structural components which extend upwardly from the bed portion of the vehicle frame assembly 60 to form the sides and roof of the passenger compartment) may be formed from a first relatively lightweight material, such as magnesium. The various structural components which are located in the lower portion of the vehicle frame assembly 60 (i.e., those structural components which form the bed portion of the vehicle frame assembly 60) may be formed from a second relatively heavier material, such as aluminum. Additionally, or alternatively, steel may be used in portions of the vehicle frame assembly 60 in conjunction with either or both of the magnesium and aluminum materials. The above-described process for molecular bonding of vehicle frame components using magnetic impulse welding techniques is advantageous because the adjacent dissimilar metals have been found not to cause corrosion when joined in this manner.

Figure 19:
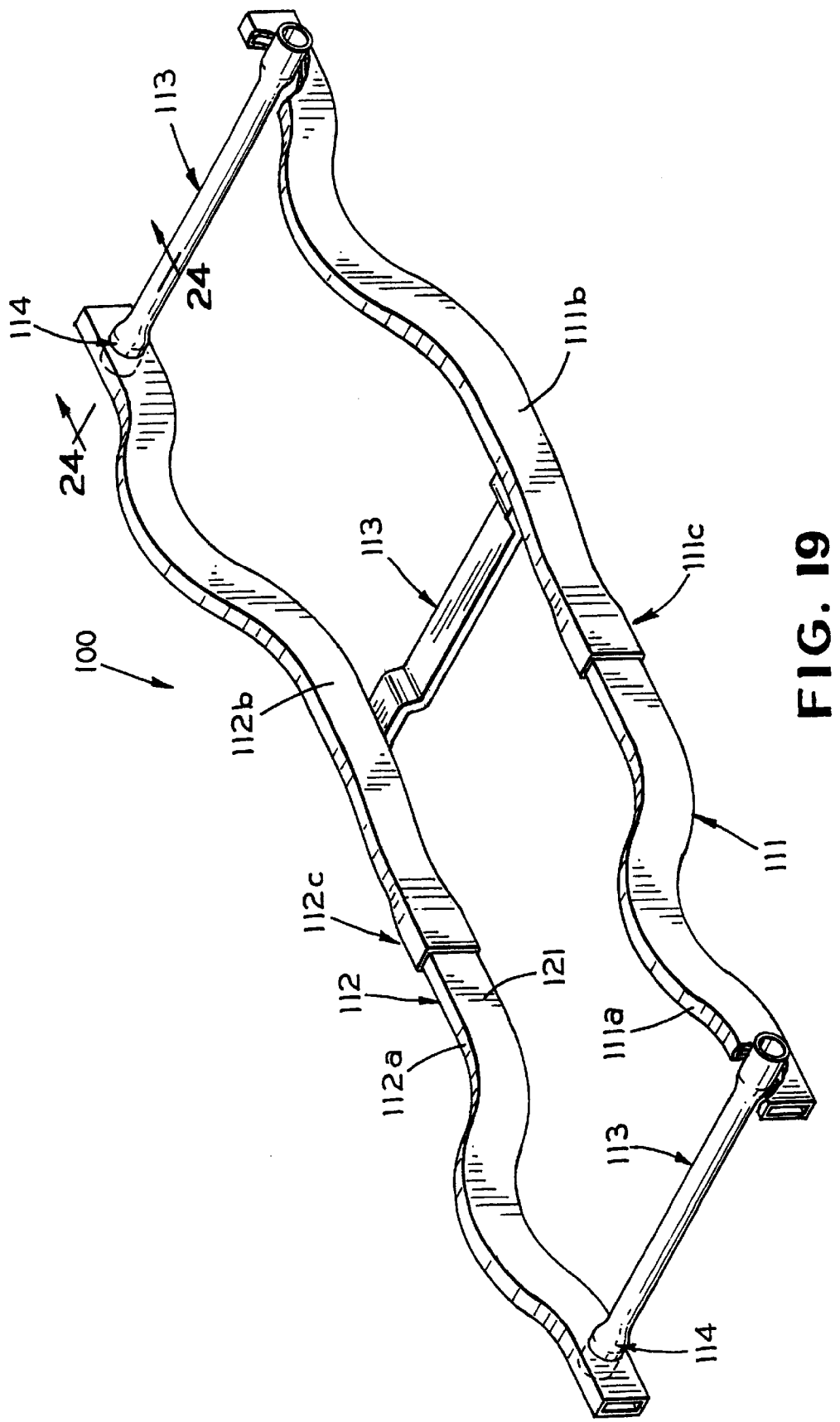
FIG. 19 is a schematic perspective view of a third embodiment of a vehicle frame manufactured in accordance with the method and apparatus of this invention.

Referring now to FIG. 19, there is illustrated a portion of a third embodiment of a full perimeter or ladder type vehicle frame assembly, indicated generally at 100, in accordance with this invention. The illustrated vehicle frame assembly 100 includes two longitudinally extending side rails, indicated generally at 111 and 112, respectively. The illustrated side rails 111 and 112 preferably extend throughout most or all of the length of the vehicle. However, it is also known to provide side rails 111 and 112 that extend throughout only a portion of the length of the vehicle. The side rails 111 and 112 are each formed from a pair of relatively short side rail sections 111*a*, 111*b* and 112*a*, 112*b*, respectively, that are secured together at respective joints, indicated generally at 111*c* and 112*c*, in a manner described in detail below.

The illustrated side rails sections 111*a*, 111*b*, 112*a*, and 112*b* are each formed from hollow members having a generally rectangular or box-shaped cross sectional shape. This cross sectional shape is advantageous not only because it provides strength and rigidity, but also because it provides vertically and horizontally oriented side surfaces that facilitate the attachment of various brackets and mounts (not shown) used to support other components of the vehicle on the vehicle frame structure 100. In the illustrated embodiment, the side rails 111 and 112 are formed from closed channel stock having a square or rectangular cross sectional shape. However, the side rails 111 and 112 may be formed from tubular stock having a generally circular or other cross sectional shape. Typically, the side rails 111 and 112 are formed from the same metallic material, such as steel. However, other materials, such as aluminum, magnesium, and the like, as well as combinations thereof, may be used if desired.

The side rail sections 111*a*, 111*b*, 112*a*, and 112*b* may be formed into desired shapes in any conventional manner. For example, hydroforming may be used to form the side rail sections 111*a*, 111*b*, 112*a*, and 112*b* to have the illustrated generally rectangular cross sectional and longitudinal shape. Hydroforming is a well known process that uses pressurized fluid to deform, expand, or re-shape a tubular member into a desired shape. In a known high pressure hydroforming process, the tubular member is initially disposed between two die sections of a hydroforming apparatus which, when closed together, define a die cavity having a desired final shape. Although the die cavity is usually somewhat larger than the tubular member itself and non-circular in cross sectional shape, the closure of the two die sections may, in some instances, cause some mechanical deformation of the tubular member. Thereafter, the tubular member is filled with a pressurized fluid, typically a relatively incompressible liquid such as water. The pressure of the fluid is increased to a magnitude where the tubular member is expanded outwardly into conformance with the die cavity. As a result, the tubular member is expanded into the desired final shape. In a known low pressure hydroforming process, the tubular member is initially filled with fluid at a relatively low pressure. Then, the tubular member is disposed between two die sections of a hydroforming apparatus which, when closed together, define a die cavity having a desired final shape. The closure of the two die sections causes deformation of the tubular member to as to conform with the die cavity. As a result, the tubular member is re-shaped into the desired final shape. It should be noted that the sequence of steps in either of the hydroforming processes may vary from that specifically described herein.

One or more cross members, indicated generally at 113, extend transversely between the side rails 111 and 112 to form the vehicle frame assembly 100 upon which the remainder of the vehicle is supported. In the illustrated embodiment, three of such cross member 113 are extend transversely at the front, center, and rear portions of the vehicle frame assembly 100. However, any desired number of cross members 113 may be provided. Each of the cross members 113 is preferably formed from a single relatively long piece of material that extends completely between the side rails 111 and 112. Alternatively, the cross members 113 may be formed from two or more relatively short pieces of material that are secured together. The method by which the ends of the cross members 113 are secured to the side rail 111 and 112 at respective joints, indicated generally at 114, will be explained in detail below.

Figure 20:
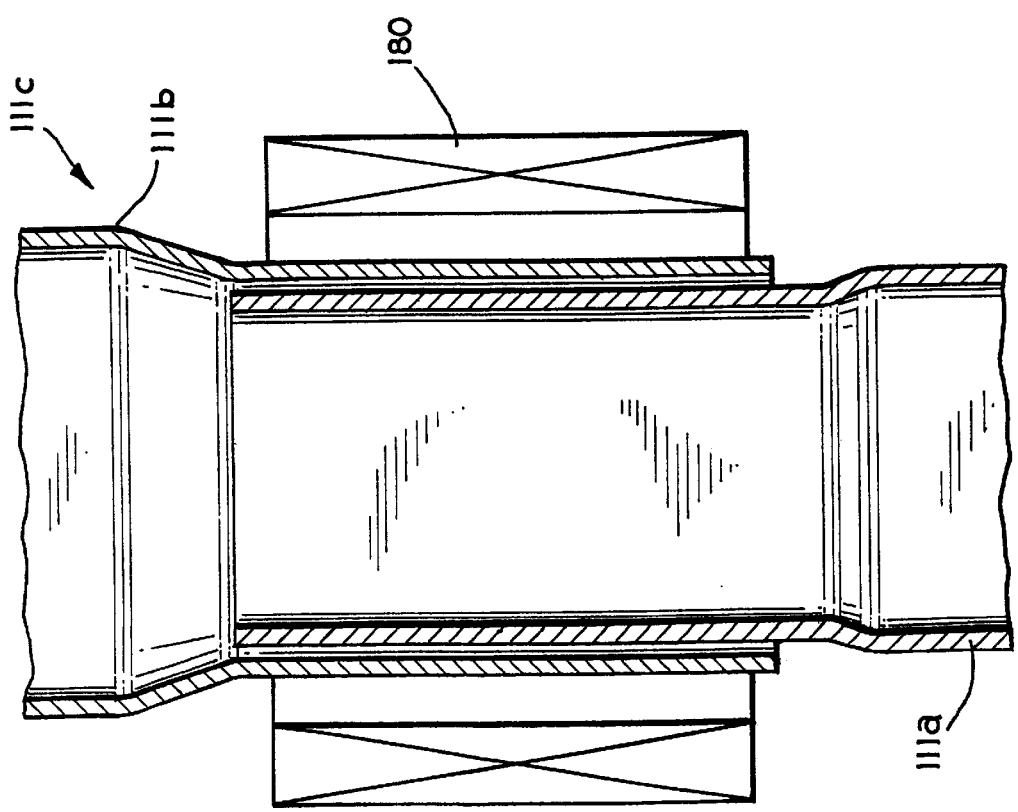
FIG. 20 is a sectional elevational view of one of the joints between two of the side rail sections illustrated in FIG. 19 prior to being joined together.
Figure 21:
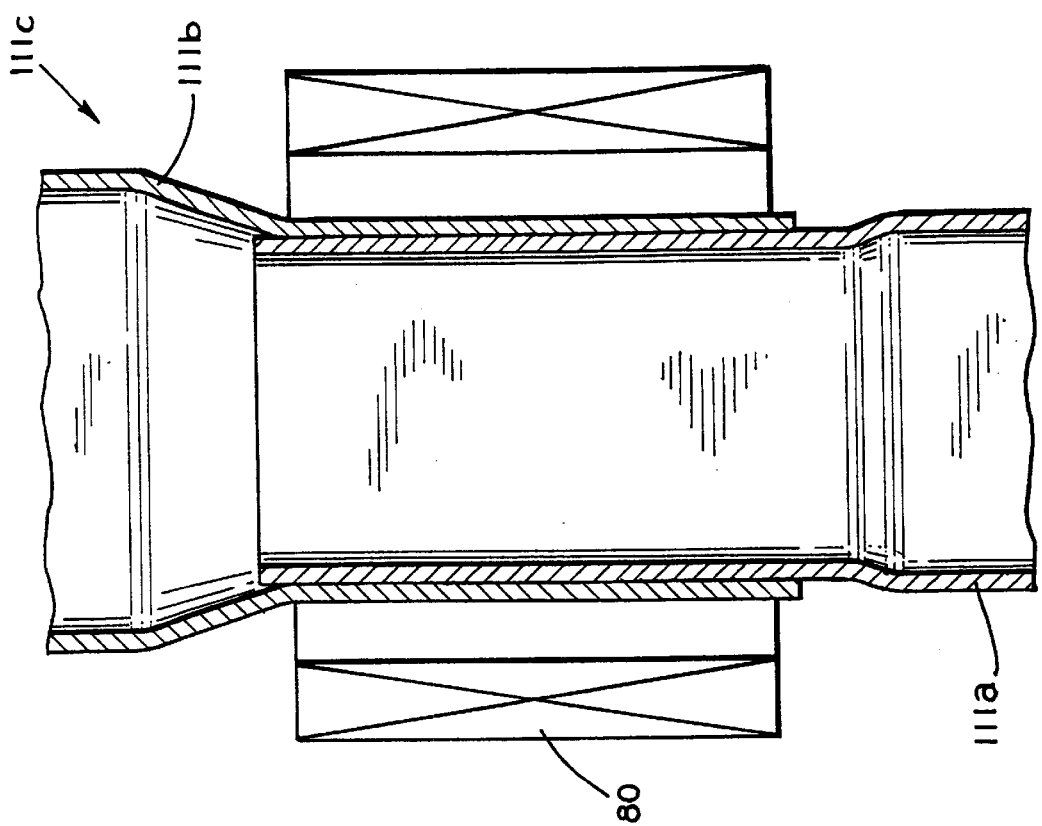
FIG. 21 is a sectional elevational view similar to FIG. 20 of the joint between two of the side rail sections illustrated in FIG. 19 after being joined together.

Referring now to FIGS. 20 and 21, the formation of the joint 111c between the side rail sections 111a and 111b is illustrated. The end portion of the side rail section 111b is initially formed slightly larger in size than the end portion of the side rail section 111a prior to being joined together. Thus, the end portion 63c of the side rail section 111a may initially be disposed telescopically within the end portion of the side rail section 111b, as shown in FIG. 20. When so disposed, the outer surface of the end portion of the side rail section 111a is disposed in a spaced apart relationship with the inner surface of the end portion of the side rail section 111b. Although the clearance between these surfaces may be adjusted as desired, it has been found acceptable to provide a clearance in the range of from 0.050 inch to 0.100 inch.

An electromagnetic coil 180 is provided for generating a magnetic field which, as will be explained further below, causes the end portion of the side rail section 111a and the end portion of the side rail section 111b to move toward one another. The electromagnetic coil 180 is disposed about the telescoping end portions of the side rail sections 111a and 111b. The electromagnetic coil 180 is similar in structure and operation to the electromagnetic coil 50 described above, and the same control circuit may be used to operate same. Thus, when the switches 51 and 54 are operated as described above, the electromagnetic field generated by the coil 180 causes the end portion of the side rail section 111b to move toward the end portion of the side rail section 111a at a high velocity. As a result, the end portion of the side rail section 111b and the end portion of the side rail section 111a are welded or molecularly bonded as described above.

FIGS. 22 and 23 illustrate two alternative embodiments of the joint 111c illustrated in FIGS. 19, 20, and 21. In FIG. 22, the closed channel side rail 111a has been replaced by an open channel side rail section 111a' having a generally U-shaped cross section to form a first modified joint 111c'. In FIG. 23, the closed channel side rail 111a has been replaced by an open channel side rail section 111a" having a generally C-shaped cross section to form a second modified joint 111c". In both of these alternative embodiments, the coil 180 causes the end portion of the side rail section 111b to become welded or molecularly bonded to the end portion of the side rail section 111a' or 111a" as described above.

FIGS. 24 through 28 illustrate a number of alternative embodiments of the joint 114 between a side rail and a cross member. In the joint 114 illustrated in FIG. 24, the side rail section 112b has an inwardly extending boss 115 formed with the inner side wall thereof. The boss 115 can be formed by any conventional method, such as by hydroforming. The end of the cross member 113 is sized to fit over the boss 115 initially with some clearance. Then, using the coil 180 described above, the end of the cross member 113 can be deformed into engagement with the boss 115 so as to become welded or molecularly bonded thereto as described above.

In a second embodiment of the joint 214 illustrated in FIG. 25, a modified side rail section 112b' has an outwardly extending flange 116 formed with the outer side wall thereof and an inwardly extending flange 117 formed with the inner side wall thereof. The flanges 116 and 117 can be formed by any conventional method, such as by hydroforming, and define an opening through the modified side rail 112'. The end of the cross member 113 is inserted through the opening so as to initially have with some clearance with each of the flanges 116 and 117. Then, using the coil 180 described above, the flanges 116 and 117 can be deformed into engagement with the end of the cross member 113 so as to become welded or molecularly bonded thereto as described above. If desired, only one of the flanges 116 and 117 may be formed on the side rail section 112b' and secured to the cross member 113.

Figure 26:
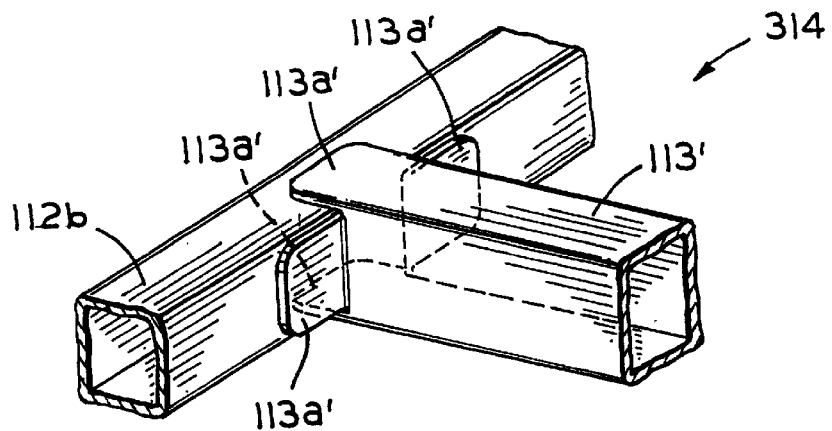
FIG. 26 is a sectional elevational view similar to FIG. 24 illustrating a third embodiment of a joint between a side rail and a cross member.

In a third embodiment of the joint 314 illustrated in FIG. 26, a modified cross member 113' includes a generally rectangular end portion having a plurality of outwardly extending tabs 113a' formed thereon. The tabs 113a' are initially oriented in a generally parallel and spaced apart relationship relative to the adjacent portions of the side rail section 112b. Then, using the coil 180 described above, each of the tabs 113a' can be deformed into engagement with the adjacent portions of the side rail section 112b so as to become welded or molecularly bonded thereto as described above. Although four of such tabs 113a' are illustrated, it will be appreciated that a lesser number of such tabs 113a' may be provided and secured to the side rail section 112b.

Figure 27:
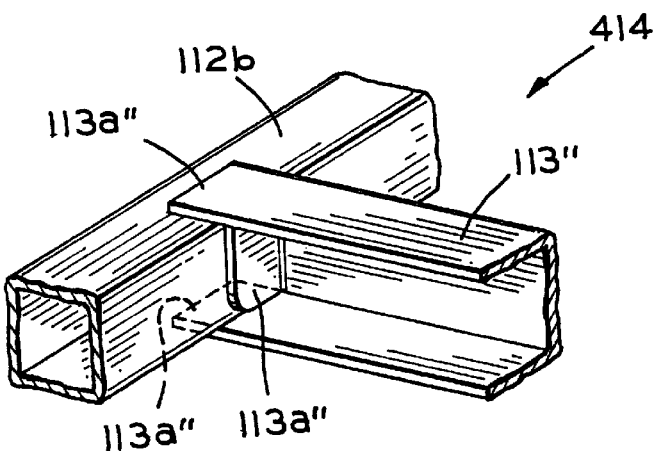
FIG. 27 is a sectional elevational view similar to FIG. 24 illustrating a fourth embodiment of a joint between a side rail and a cross member.

In a fourth embodiment of the joint 414 illustrated in FIG. 27, a further modified cross member 113" is formed having a generally C-shaped or U-shaped cross section. The cross member 113" includes a generally rectangular end portion having a plurality of outwardly extending tabs 113a" formed thereon. The tabs 113a" are initially oriented in a generally parallel and spaced apart relationship relative to the adjacent portions of the side rail section 112b. Then, using the coil 180 described above, each of the tabs 113a" can be deformed into engagement with the adjacent portions of the side rail section 112b so as to become welded or molecularly bonded thereto as described above. Although three of such tabs 113a" are illustrated, it will be appreciated that a lesser number of such tabs 113a" may be provided and secured to the side rail section 112b.

Figure 28:
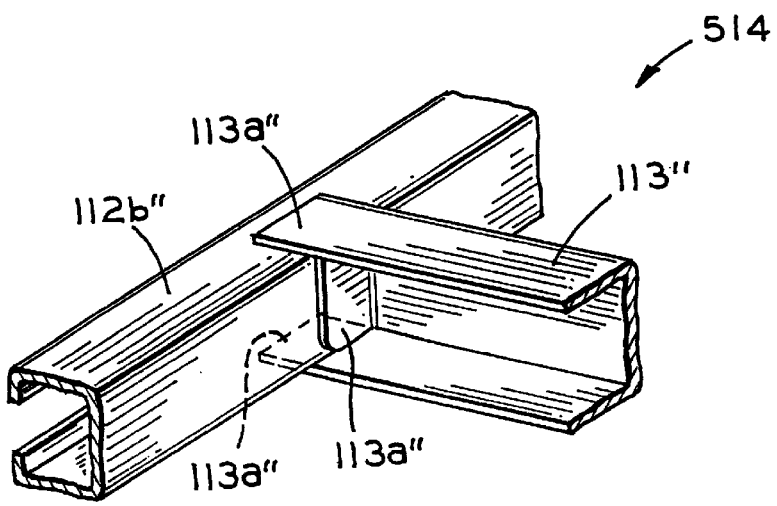
FIG. 28 is a sectional elevational view similar to FIG. 24 illustrating a fifth embodiment of a joint between a side rail and a cross member.

In a fifth embodiment of the joint 514 illustrated in FIG. 28, a modified side rail section 112b" is formed having a generally C-shaped or U-shaped cross section. The modified cross member 113" is formed having a generally C-shaped or U-shaped cross section. The cross member 113" includes a generally rectangular end portion having a plurality of outwardly extending tabs 113a" formed thereon. The tabs 113a' are initially oriented in a generally parallel and spaced apart relationship relative to the adjacent portions of the side rail section 112b". Then, using the coil 180 described above, each of the tabs 113a" can be deformed into engagement with the adjacent portions of the side rail section 112b" so as to become welded or molecularly bonded thereto as described above. Although three of such tabs 113a" are illustrated, it will be appreciated that a lesser number of such tabs 113a" may be provided and secured. to the side rail section 112b".

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A method for manufacturing a vehicle frame assembly comprising the steps of:
   (a) providing first and second structural components;
   (b) disposing portions of the first and second structural components in an overlapping relationship;
   (c) generating an electromagnetic field that causes at least one of the overlapping portions of the first and second structural components to move into contact with the other of the overlapping portions of the first and second structural components at a high velocity so as to be joined together to form a joint;
   (d) providing third and fourth structural components; and
   (e) joining the third and fourth structural components to the first and second structural components together to form a vehicle frame assembly.

2. The method defined in claim 1 wherein said step (a) is performed by providing first and second side rail sections.

3. The method defined in claim 1 wherein said step (a) is performed by providing a side rail and a cross member.

4. The method defined in claim 1 wherein said step (a) is performed by first and second structural components of a space frame assembly.

5. The method defined in claim 1 wherein said step (a) is performed by providing first and second structural members that each have a closed channel cross sectional shape.

6. The method defined in claim 1 wherein said step (a) is performed by providing first and second structural members that each have an open channel cross sectional shape.

7. The method defined in claim 1 wherein said step (a) is performed by providing a first structural member that has a closed channel cross sectional shape and a second structural member that has an open channel cross sectional shape.

8. The method defined in claim 1 wherein said step (a) is performed by providing first and second structural components that are formed from different materials.

9. The method defined in claim 8 wherein said step (a) is performed by providing first and second structural components that are formed from different metals or alloys of metals.

10. The method defined in claim 9 wherein said step (a) is performed by providing first and second structural components that are selecting from the group consisting of steel, aluminum, and magnesium.

11. The method defined in claim 1 wherein said step (a) includes the step of hydroforming at least one of the first and second structural components to have a desired shape.

12. The method defined in claim 1 wherein said step (a) includes the steps of pre-bending at least one of the first and second structural components to have a desired preliminary shape and hydroforming the pre-bent one of the first and second structural components to have a desired final shape.

13. The method defined in claim 1 wherein said step (b) is performed by providing an electromagnetic coil about the overlapping portions of the first and second structural members and connecting the electromagnetic coil to a source of electrical energy so as to generate the electromagnetic field.

14. The method defined in claim 13 wherein the electromagnetic coil is provided concentrically about the overlapping portions of the first and second structural members.

* * * * *